(12) United States Patent
Nguyen et al.

(10) Patent No.: US 11,746,746 B2
(45) Date of Patent: Sep. 5, 2023

(54) METHOD OF DETERMINING AVERAGE WIND SPEED BY MEANS OF A LIDAR SENSOR

(71) Applicant: IFP Energies nouvelles, Rueil-Malmaison (FR)

(72) Inventors: Hoai-Nam Nguyen, Rueil-Malmaison (FR); Fabrice Guillemin, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 17/477,951

(22) Filed: Sep. 17, 2021

(65) Prior Publication Data

US 2022/0106937 A1 Apr. 7, 2022

(30) Foreign Application Priority Data

Oct. 1, 2020 (FR) ...................................... 2010050

(51) Int. Cl.
*F03D 7/02* (2006.01)
*G01S 17/95* (2006.01)
*G05B 17/02* (2006.01)

(52) U.S. Cl.
CPC ................ *F03D 7/02* (2013.01); *G01S 17/95* (2013.01); *G05B 17/02* (2013.01); *F05B 2260/80* (2013.01); *F05B 2260/84* (2013.01); *F05B 2270/32* (2013.01); *F05B 2270/322* (2013.01); *F05B 2270/8042* (2013.01)

(58) Field of Classification Search
CPC .............. F05B 2260/84; F05B 2270/32; F05B 2270/322; F05B 2270/8042; F03D 7/02
See application file for complete search history.

(56) References Cited

U.S. PATENT DOCUMENTS

| 6,320,272 | B1 * | 11/2001 | Lading | ................. F03D 7/0224 290/55 |
|---|---|---|---|---|
| 11,248,585 | B2 * | 2/2022 | Nguyen | ................. G01S 17/58 |
| 2013/0094961 | A1 * | 4/2013 | Couchman | .............. F03D 7/042 416/31 |

(Continued)

FOREIGN PATENT DOCUMENTS

| EP | 2581761 A1 | 4/2013 | |
|---|---|---|---|
| EP | 3343026 A1 * | 7/2018 | ........... F03D 7/0224 |

(Continued)

OTHER PUBLICATIONS

US Department of Enegy. Doppler Lidar. www.arm.gov/capabilities/instruments/dl (Year: 2022).*

(Continued)

*Primary Examiner* — Topaz L. Elliott
(74) *Attorney, Agent, or Firm* — Fitch, Even, Tabin & Flannery LLP

(57) ABSTRACT

The present invention is a method of determining the average wind speed in a vertical plane by use of a LiDAR sensor (2), comprising performing measurements (MES), constructing a measurement model (MOD M) and a wind model (MOD V). Then an adaptive Kalman filter (KAL) is used to determine the wind speed (v), and determining the average wind speed in the vertical plane under consideration (RAWS).

14 Claims, 3 Drawing Sheets

(56) References Cited

U.S. PATENT DOCUMENTS

| 2015/0145253 | A1* | 5/2015 | Bayon | F03D 9/25 416/61 |
|---|---|---|---|---|
| 2020/0124026 | A1* | 4/2020 | Nguyen | G01S 17/95 |
| 2020/0301020 | A1* | 9/2020 | Guillemin | F03D 17/00 |
| 2020/0400836 | A1* | 12/2020 | Nguyen | G01P 21/025 |
| 2021/0277867 | A1* | 9/2021 | Guillemin | F03D 17/00 |

FOREIGN PATENT DOCUMENTS

| FR | 3068139 A1 | 12/2018 | |
| WO | WO-2021249728 A1 * | 12/2021 | |
| WO | WO-2022002563 A1 * | 1/2022 | F03D 7/0224 |

OTHER PUBLICATIONS

Jørgen Højstrup. Spectral coherence in wind turbine wakes. Journal of Wind Engineering and Industrial Aerodynamics. vol. 80, Issues 1-2. 1999. pp. 137-146. ISSN 0167-6105. https://doi.org/10.1016/S0167-6105(98)00198-6. (https://www.sciencedirect.com/science/article/pii/S0167610598001986) (Year: 1999).*

Windar Photonics. Wind. https://www.windarphotonics.com/f/f1/Windar_Photonics_WindEYE_flyer_2018.pdf (Year: 2018).*

French Preliminary Search Report for FR Application No. 20/10.050 dated May 26, 2021.

P. Towers et al.: "Real-time wind field reconstruction from LiDAR wind model and state estimation: LiDAR wind field estimation," Wind Energy, vol. 19, No. 1. Nov. 21, 2014. pp. 133-150, XP055451329, GB, ISSN: 1095-4244, DOI: 10.1002/we.1824.

David Schlipf, et al.: "Field Testing of Feedforward Collective Pitch Control on the CART2 Using a Nacelle-Based Lidar Scanner," Journal of Physics: Conference Series, Institute of Physics Publishing, Bristol, GB, vol. 555, No. 1. Dec. 16, 2014. p. 12090, XP020275726, ISSN: 17/42-6596, DOI: 10.1088/1742-6596/555/1/012090.

* cited by examiner

[Fig 1]
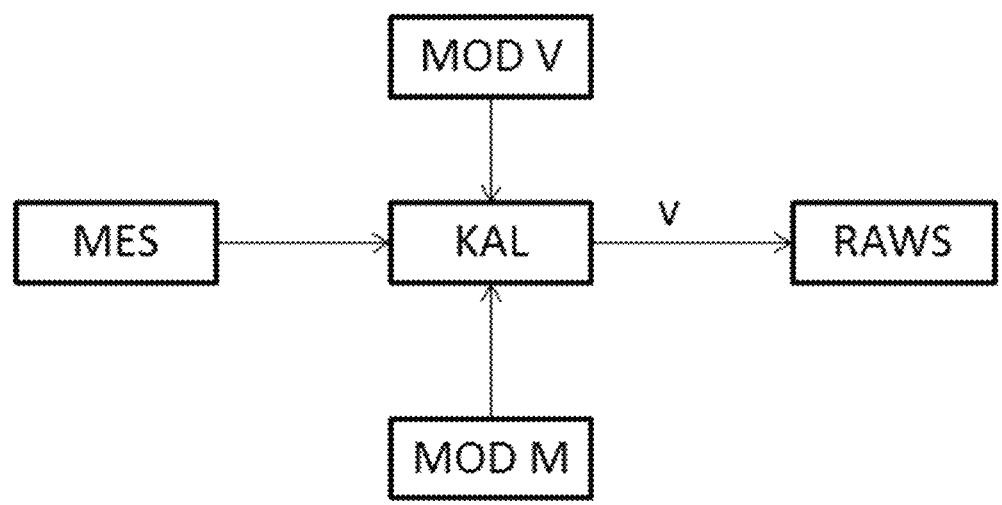
[Fig 2]
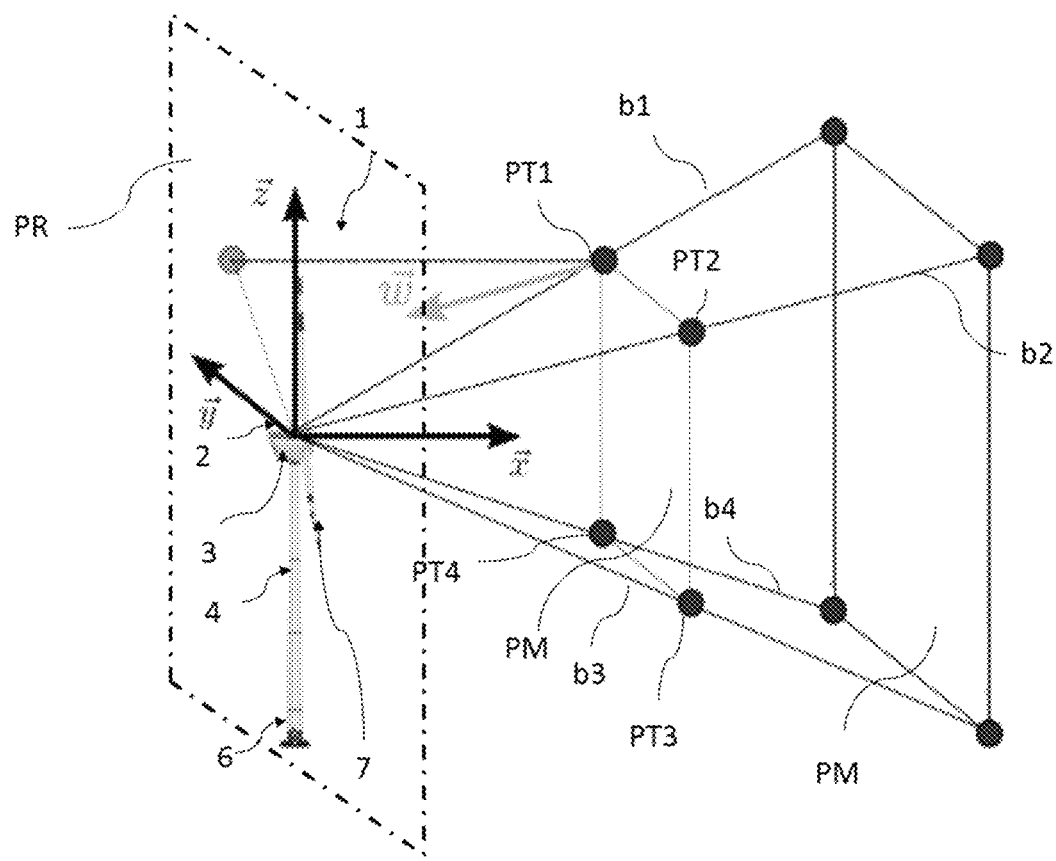

[Fig 3]
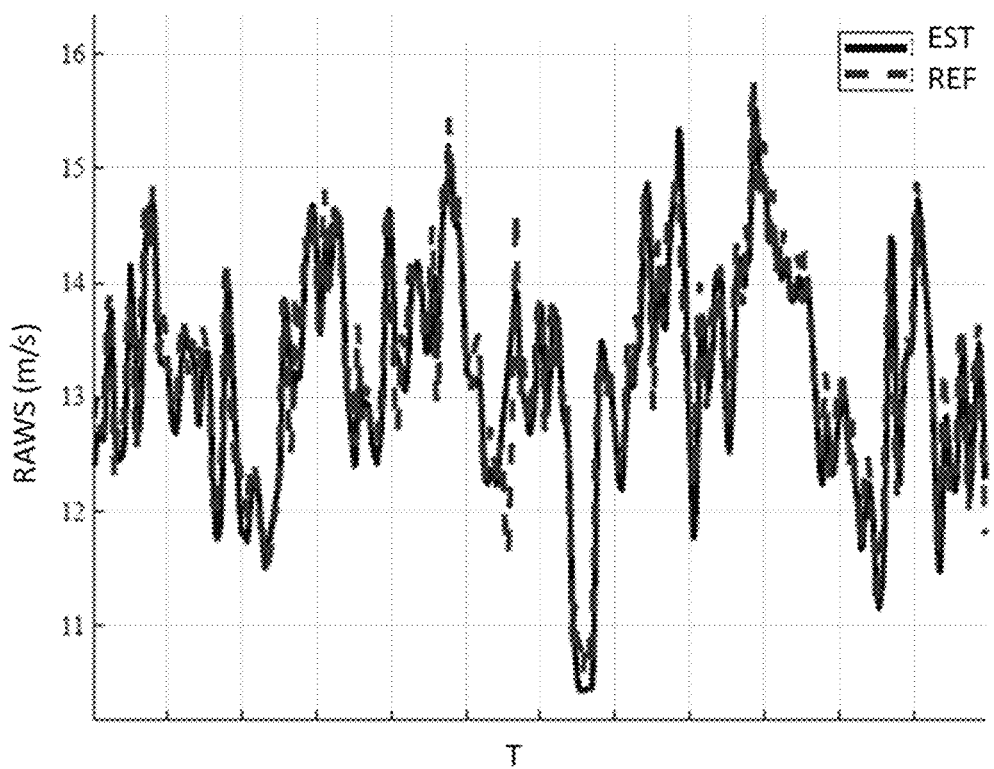

[Fig 4]
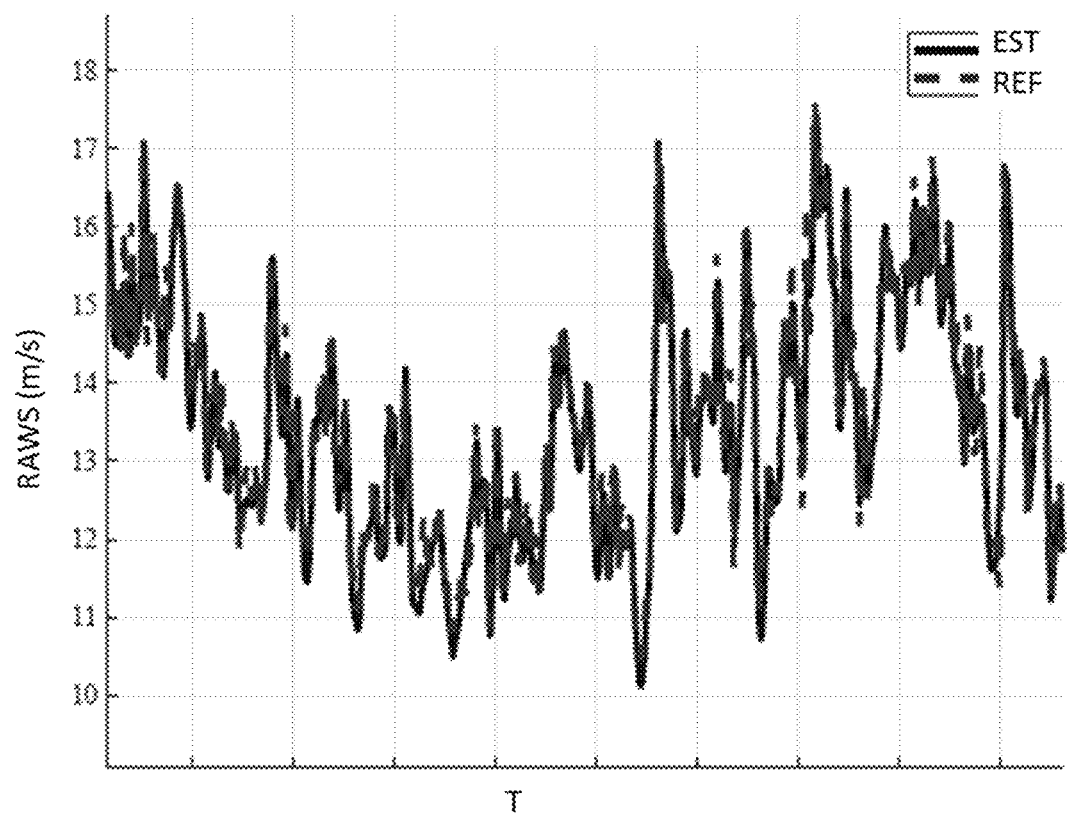

METHOD OF DETERMINING AVERAGE WIND SPEED BY MEANS OF A LIDAR SENSOR

CROSS-REFERENCE TO RELATED APPLICATIONS

This application claims priority from French Application No. 20/10.050 filed Oct. 1, 2020 which are hereby incorporated herein by reference in their entirety.

FIELD OF THE INVENTION

The present invention relates to the field of renewable energies and more particularly to the measurement of the resource of wind turbines, the wind, with wind prediction, turbine control (orientation, torque and speed regulation) and at least one of diagnosis and monitoring objectives.

DESCRIPTION OF THE PRIOR ART

A wind turbine converts the kinetic energy from the wind into electrical or mechanical energy. For conversion of wind to electrical energy, the wind turbine has the following elements:
- a tower which positions a rotor at a sufficient height to enable motion thereof (necessary for horizontal-axis wind turbines) or the rotor to be positioned at a height enabling it to be driven by a stronger and more regular wind than at ground level. The tower generally houses part of the electrical and electronic components (modulator, control, multiplier, generator, etc.);
- a nacelle mounted at the top of the tower, housing mechanical, pneumatic and some electrical and electronic components which are necessary to operate the turbine. The nacelle rotates to orient the machine in the right direction;
- a rotor fastened to the nacelle, comprising blades (generally three) and the hub of the wind turbine. The rotor is driven by the wind energy and it is connected by a mechanical shaft, directly or indirectly (via a gearbox and mechanical shaft system), to an electrical machine (electrical generator) that converts the energy recovered to electrical energy. The rotor is potentially provided with control systems such as variable-angle blades or aerodynamic brakes; and
- optionally a transmission, notably made up of two shafts (a mechanical shaft of the rotor and a mechanical shaft of the conversion machine) connected by a transmission (gearbox).

Since the beginning of the 1990s, there has been renewed interest in wind power, in particular in the European Union where the annual growth rate is about 20%. This growth is attributed to the inherent possibility for carbon-emission-free electricity generation. In order to sustain this growth, however, the energy yield of wind turbines still needs to be further improved. The prospect of a wind power production increase requires developing effective production tools and advanced control tools in order to improve the performances of the machines. Wind turbines are designed to produce electricity at the lowest possible cost. They are therefore generally built to reach their maximum performance at a wind speed of approximately 15 m/s. It is not necessary to design wind turbines that maximize their yield at higher wind speeds, which are not common. In the case of wind speeds above 15 m/s, it is necessary to lose part of the additional energy contained in the wind to avoid damage to the wind turbine. All wind turbines are therefore designed with a power regulation system.

For this power regulation, controllers have been designed for variable-speed aerogenerators. The purpose of the controllers is to maximize the electric power recovered, to minimize the rotor speed fluctuations, and to minimize the fatigue and the extreme moments of the structure (blades, tower and platform).

To optimize control, it is important to know the average wind speed. Various techniques have been developed to that end.

According to a first technique, using an anemometer allows estimation of a wind speed at one point, but this imprecise technology does not enable measuring an entire wind field or knowing the three-dimensional components of the wind speed.

According to a second technique, a LiDAR (Light Detection And Ranging) sensor is used. LiDAR is a remote sensing or optical measurement technology based on the analysis of the properties of a beam returned to the emitter. This method is notably used for determining the distance to an object by use of a pulse laser. Unlike radars based on a similar principle, LiDAR sensors use visible or infrared light instead of radio waves. The distance to an object or a surface is given by the measurement of the delay between the pulse and the detection of the reflected signal.

In the field of wind turbines, LiDAR sensors are considered essential for proper functioning of large wind turbines, especially now that their size and power is increasing (today 5 MW, soon 15 MW for offshore turbines). This sensor enables remote wind measurements, first allowing wind turbines to be calibrated so that they can deliver maximum power (power curve optimization). For this calibration stage, the sensor can be positioned on the ground and vertically oriented (profiler), which allows measuring the wind speed and direction, as well as the wind gradient depending on the altitude. This application is particularly critical because it allows knowing the energy generating resource. This is important for wind turbine projects since it conditions the financial viability of the project.

A second application sets the sensor on the nacelle of the wind turbine in order to measure the wind field in front of the turbine while being nearly horizontally oriented. A priori, measuring the wind field in front of the turbine allows knowing in advance the turbulence the wind turbine is going to encounter shortly thereafter. However, current wind turbine control and monitoring techniques do not allow accounting for measurement performed by a LiDAR sensor by estimating precisely the average wind speed in the rotor plane. Such an application is notably described in patent application FR-3-013,777 and corresponding published patent application US-2015-145,253.

Furthermore, one specific feature of the use of LiDAR sensors is that the distances from the measurement planes to the rotor plane of the wind turbine can be imposed by the LiDAR user which can be different from one LiDAR sensor to another, and can be unknown. In this case, it is not possible to use wind speed determination methods such as those described in patent applications FR-3,068,139 and corresponding published patent application US-2020/0,124,026 and FR-3,088,971 corresponding to U.S. published patent application US-2020/0,166,650, which require knowing the distance between the measurement planes and the rotor plane of the wind turbine.

SUMMARY OF THE INVENTION

The present invention determines the average wind speed in a vertical plane by use of a LiDAR sensor, for which the distance from the measurement planes to the rotor plane of the wind turbine are not required, which allows the user of the LiDAR sensor to freely parametrize the LiDAR sensor. The present invention therefore relates to a method of determining the average wind speed in a vertical plane by use of a LiDAR sensor, comprising performing measurements, constructing a measurement model and a wind model, using an adaptive Kalman filter to determine the wind speed, and determining the average wind speed in the vertical plane being considered. These steps require no a priori constraints on the measurement planes of the LiDAR sensor. Thus, the method according to the invention can be used for any LiDAR sensor configuration. The wind model enables precise representation of the wind speed while being independent of the distances from the measurement planes of the LiDAR sensor.

The invention relates to a method of determining the average wind speed in a vertical plane by use of a LiDAR sensor positioned on a wind turbine. The following steps are carried out for this method:

a) constructing a model of the LiDAR measurements;
b) constructing a wind model accounting for the spatial coherence and the temporal coherence of the wind speed;
c) measuring, by use of the LiDAR sensor, the wind amplitude and direction in at least one measurement plane distant from the wind turbine;
d) determining the wind speed at various predefined estimation points in the space upstream from the wind turbine by use of an adaptive Kalman filter using the model of the LiDAR measurements, the wind model, and the measurements, and
e) determining the average wind speed in the vertical plane at a distance from the wind turbine by means of the wind speeds determined for the predefined estimation points of the vertical plane being considered.

According to one embodiment, the model of the LiDAR measurements is written as follows: $m_{j,x}(k) = a_j v_{j,x}(k) + b_j v_{j,y}(k) + c_j v_{j,z}(k)$, with m being the measurement, x being the longitudinal direction, j being a measurement beam of the LiDAR sensor, $m_{j,x}$ being the measurement on measurement beam j at distance x, k being the discrete time, v being the wind speed, $v_{j,x}$ being the longitudinal component of the wind speed for measurement beam j, $v_{j,y}$ being the transverse component of the wind speed for measurement beam j, $v_{j,z}$ being the vertical component of the wind speed for measurement beam j, and $a_j$, $b_j$, $c_j$ being constant measurement coefficients for measurement beam j.

According to one implementation, the spatial coherence of the wind model is a function of a transverse coherence, a vertical coherence and a longitudinal coherence.

Preferably, the transverse coherence is written as: $v_{x,y1} = f_t(v_{x,y2}, y1-y2)$, with x being the longitudinal component, $y_1$ and $y_2$ being transverse positions having the same longitudinal and vertical values, $v_{x,y1}$ being the longitudinal component of the wind speed at position $y_1$, $v_{x,y2}$ being the longitudinal component of the wind speed at position $y_2$ and $f_t$ being a predefined function.

Advantageously, the vertical coherence is written as:

$$v_{x,z1} = v_{x,z2}\left(\frac{z_1}{z_2}\right)^\alpha$$

with x being the longitudinal component, $z_1$ and $z_2$ being vertical positions having the same longitudinal and transverse values, $v_{x,z1}$ being the longitudinal component of the wind speed at position $z_1$, $v_{x,z2}$ being the longitudinal component of the wind speed at position $z_2$ and $\alpha$ being the coefficient of the power law.

Advantageously, the longitudinal coherence is written as: $v_{x,x1}(k) = f_l(v_{x,x2}(k), x_1-x_2)$, with x being the longitudinal component, k being the discrete time, $x_1$ and $x_2$ being longitudinal positions having the same transverse and vertical values, $v_{x,x1}$ being the longitudinal component of the wind speed at position $x_1$, $v_{x,x2}$ being the longitudinal component of the wind speed at position $x_2$ and $f_l$ being a predefined function.

According to one aspect, the temporal coherence of said wind model is written as: $\omega(k) = A_s \omega(k-1)$, with k being the discrete time, $\omega$ being a vector that comprises first the longitudinal components of the wind speed at n predefined estimation points, then the transverse components of the wind speed for the n predefined estimation points, $A_s$ is a constant matrix which is the autocorrelation function of the wind speed obtained by a Kaimal spectrum.

According to one embodiment, the adaptive Kalman filter is applied to the following equations: $v_x(k) = A_s v_x(k-1) + n(k)$ and $$\begin{cases} v_{x,y_1}(k) - f_t(v_{x,y_2}(k), y_1 - y_2) = \epsilon_t(x_1, x_2, y_1, y_2, z_1, z_2, k) \\ v_{x,z_1} - v_{x,z_2}\left(\frac{z_1}{z_2}\right)^\alpha = \epsilon_v(x_1, x_2, y_1, y_2, z_1, z_2, k) \\ v_{x,x_1}(k) - f_l(v_{x,x_2}(k), x_1 - x_2) = \epsilon_l(x_1, x_2, y_1, y_2, z_1, z_2, k) \\ m_{j,x}(k) = a_j v_{j,x}(k) + b_j v_{j,y}(k) + c_j v_{j,z}(k) + \epsilon_m(k) \end{cases}$$

with k being the discrete time, v being the wind speed, x being the longitudinal component, $y_1$ and $y_2$ being transverse positions having the same longitudinal and vertical values, $x_1$ and $x_2$ being longitudinal positions having the same transverse and vertical values, $z_1$ and $z_2$ being vertical positions having the same longitudinal and transverse values, $v_{x,y1}$ being the longitudinal component of the wind speed at position $y_1$, $v_{x,y2}$ being the longitudinal component of the wind speed at position $y_2$, $f_t$ being a predefined function, $v_{x,x1}$ being the longitudinal component of the wind speed at position $x_1$, $v_{x,x2}$ being the longitudinal component of the wind speed at position $x_2$, $f_l$ being a predefined function, $v_{x,z1}$ being the longitudinal component of the wind speed at position $z_1$, $v_{x,z2}$ being the longitudinal component of the wind speed at position $z_2$, $\alpha$ being the coefficient of the power law, j being a measurement beam of the LiDAR sensor, $m_{j,x}$ being the measurement on measurement beam j at distance x, $v_{j,x}$ being the longitudinal component of the wind speed for measurement beam j, $v_{j,y}$ being the transverse component of the wind speed for measurement beam j, $v_{j,z}$ being the vertical component of the wind speed for measurement beam j, $a_j$, $b_j$, $c_j$ being constant measurement coefficients for measurement beam j, $\eta$ being the noise of the equation of state, $\epsilon_t$ being the transverse noise, $\epsilon_v$ being the vertical noise, $\epsilon_l$ being the longitudinal noise, $\epsilon_m$ being the measurement noise, $A_s$ being a constant matrix which is the autocorrelation function of the wind speed obtained by a Kaimal spectrum.

According to one implementation, said wind speed is determined at different points using the following equations:

$$\begin{cases} \hat{\omega}(k \mid k-1) = A_s \hat{\omega}(k-1 \mid k-1) \\ P(k \mid k-1) = A_s P(k-1 \mid k-1) A_s^T + Q \end{cases} \text{ and}$$

-continued $$\begin{cases} K(k) = P(k \mid k-1)C_a^T(C_aP(k \mid k-1)C_a^T + R)^{-1} \\ \hat{\omega}(k \mid k) = \hat{\omega}(k \mid k-1) + K(k)(y(k) - C_a\hat{\omega}(k \mid k-1)) \\ P(k \mid k) = (I - K(k)C_a)P(k \mid k-1) \end{cases}$$

with k being the discrete time, ω being a vector that comprises first the longitudinal components of the wind speed at n predefined estimation points, $\hat{\omega}(k|k-1)$ being the estimation of vector ω(k) given the measurements performed until time k−1, $\hat{\omega}(k|k)$ being the estimation of vector ω(k) given the measurements performed until time k, P(k|k−1) being the covariance matrix of vector ω(k) given the measurements performed until time k−1, P(k|k) being the covariance matrix of vector ω(k) given the measurements performed until time k, $A_s$ being a constant matrix which is the autocorrelation function of the wind speed obtained by the Kaimal spectrum, Q and R being the covariance matrices of noises ε(k) and η(k), $C_a$ being obtained by linearizing the output equations around $\hat{\omega}(k|k-1)$, y(k) being the measurements of the LiDAR sensor and I being the identity matrix.

According to an embodiment option, the wind speed is determined in the vertical plane at a distance from the wind turbine by use of the average of the longitudinal components of the wind speed of the points belonging to the vertical plane, preferably the wind speeds considered are those included in a projection of the surface swept by the rotor of the wind turbine in the vertical plane considered.

The invention further relates to a method of controlling a wind turbine. This method comprises the following steps:
 a) determining the average wind speed by means of the method according to one of the above features; and
 b) controlling the wind turbine according to the average wind speed.

Furthermore, the invention relates to a computer program product comprising code instructions which carry out the steps of a method according to one of the above features, when the program is executed on at least one of a control and a diagnosis unit of the wind turbine.

Moreover, the invention relates to a LiDAR sensor comprising a processor implementing a method according to any one of the above features.

The invention also relates to a wind turbine comprising a LiDAR sensor according to any one of the above features, the LiDAR sensor being preferably positioned on the nacelle of said wind turbine or in the hub of the wind turbine.

BRIEF DESCRIPTION OF THE DRAWINGS

Other features and advantages of the method according to the invention will be clear from reading the description hereafter of embodiments given by way of non-limitative example, with reference to the accompanying drawings wherein:

FIG. 1 illustrates the steps of the method of determining the average wind speed according to an embodiment of the invention;

FIG. 2 illustrates a wind turbine equipped with a LiDAR sensor according to an embodiment of the invention;

FIG. 3 illustrates, for a first example, the comparison between the average wind speed 100 m from the rotor of a wind turbine obtained with the method according to one embodiment of the invention and the reference average wind speed; and FIG. 4 illustrates, for a second example, the comparison between the average wind speed 110 m from the rotor of a wind turbine obtained with the method according to one embodiment of the invention and the reference average wind speed.

DETAILED DESCRIPTION OF THE INVENTION

The present invention relates to a method of determining the average wind speed in a vertical plane, by a LiDAR sensor positioned on a wind turbine.

According to the invention, the LiDAR sensor measures the wind speed over at least one measurement plane upstream from the wind turbine. There are several types of LiDAR sensors, for example scanning LiDAR sensors, continuous wave or pulsed LiDAR sensors. Within the context of the invention, a pulsed LiDAR is preferably used. However, the other LiDAR technologies may also be used while remaining within the scope of the invention.

LiDAR sensors provide fast measurement. Therefore, using such a sensor enables fast continuous determination of the average wind speed. For example, the sampling rate of the LiDAR sensor can range between 1 and 5 Hz (or more in the future), and it can be 4 Hz. Furthermore, the LiDAR sensor allows obtaining information relative to the wind upstream from the turbine, which is related to the wind blowing towards the turbine. The LiDAR sensor can therefore be used for predicting the wind speed in the turbine rotor plane.

FIG. 2 schematically shows, by way of non-limitative example, a horizontal-axis wind turbine 1 equipped with a LiDAR sensor 2 for the method according to one embodiment of the invention. LiDAR sensor 2 is used to measure the wind speed at a given distance over measurement planes PM (only two measurement planes are shown). Knowing the wind measurement in advance a priori allows providing substantial information. This figure also shows axes x, y and z. The reference point of this coordinate system is the center of the rotor. Direction x is the longitudinal direction corresponding to the direction of the rotor axis, upstream from the wind turbine, which also corresponds to the measurement direction of LiDAR sensor 2. Direction y, which is perpendicular to direction x, is the lateral or transverse direction located in a horizontal plane (directions x, y form a horizontal plane). Direction z is the vertical direction (substantially corresponding to the direction of tower 4) pointing up, axis z is perpendicular to axes x and y. The rotor plane is indicated by the rectangle in dotted line PR which is defined by directions y, z for a zero value of x. Measurement planes PM are planes formed by directions y, z at a distance from rotor plane PR (for a non-zero value of x). Measurement planes PM are parallel to rotor plane PR.

Conventionally, a wind turbine 1 converts the kinetic energy of the wind into electrical or mechanical energy. For conversion of wind energy to electrical energy, the following elements are used:
 a tower 4 allows a rotor (not shown) to be positioned at a sufficient height to enable motion thereof (necessary for horizontal-axis wind turbines) and allowing at least one of the rotor to be positioned at a height enabling it to be driven by stronger and more regular winds than at ground level 6. Tower 4 generally houses part of the electric and electrical components (modulator, control, multiplier, generator, etc.),
 a nacelle 3 mounted at the top of tower 4, housing mechanical, pneumatic and some electrical and electronic components (not shown) necessary for operating the machine. Nacelle 3 can rotate to orient the machine in the right direction, a rotor, fastened to the nacelle, comprising blades 7 (generally three) and the hub of the wind turbine. The rotor is driven by the wind energy and it is connected by a mechanical shaft, directly or indirectly (via a gearbox and mechanical shaft system), to an electrical machine (electric generator) (not shown) that converts the energy recovered to electrical energy. The rotor is potentially provided with control systems such as a variable-angle blades or aerodynamic brakes, optionally a transmission made up of two shafts (mechanical shaft of the rotor and mechanical shaft of the electrical machine) connected by a transmission (gearbox) (not shown).

As is visible in FIG. 2, which is an example embodiment of a pulsed LiDAR sensor, the LiDAR sensor 2 comprises four measurement beams or axes (b1, b2, b3, b4). By way of non-limitative example, the method according to the invention also works with a LiDAR sensor comprising any number of beams. The LiDAR sensor performs a punctual measurement at each point of intersection of a measurement plane PM and a beam (b1, b2, b3, b4). These measurement points are represented by black circles in FIG. 2, for the first measurement plane PM with the measurement points being denoted by PT1, PT2, PT3 and PT4. Processing the measurements at these measurement points allows determination of the wind speed in measurement planes PM.

Preferably, LiDAR sensor 2 can be mounted on nacelle 3 of wind turbine 1 or in the hub of wind turbine 1 (that is at the front end of the nacelle in the wind direction).

According to the invention, the method of determining the average wind speed comprises the steps of:
1) Construction of a LiDAR sensor measurement model
2) Construction of a wind model
3) Wind measurement
4) Determination of the wind speed
5) Determination of the average wind speed.

Steps 3), 4) and 5) are carried out in real time. Steps 1) and 2) can be carried out offline and prior to the real-time steps, and they can be performed in this order, in the reverse order or simultaneously. All the steps are described in detail in the rest of the description.

FIG. 1 schematically illustrates, by way of non-limitative example, the steps of the method according to an embodiment of the invention. The method determines the average wind speed in a vertical plane by use of a LiDAR sensor arranged on a wind turbine. A first step constructs offline a wind model MOD V and a measurement model MOD M. Then, the amplitude and the direction of the wind MES are measured in real time by means of the LiDAR sensor. The wind speed v is then determined in real time at various points by use of an adaptive Kalman filter KAL, which uses wind model MOD V, measurement model MOD M and measurements MES. Finally, the average wind speed RAWS is determined from wind speed v at different points.

1) Construction of a LiDAR Sensor Measurement Model

This step constructs a model of the LiDAR sensor measurements. It is a model relating the components of the wind speed to the measurement signal from the LiDAR sensor.

According to one embodiment of the invention, the LiDAR sensor measurement model can be written as follows:

$m_{j,x}(k)=a_j v_{j,x}(k)+b_j v_{j,y}(k)+c_j v_{j,z}(k)$, with m being the measurement, x being the longitudinal direction, j being a measurement beam of the LiDAR sensor, $m_{j,x}$ being the measurement on measurement beam j at distance x, k being the discrete time, v the wind speed, $v_{j,x}$ the longitudinal component of the wind speed for measurement beam j, $v_{j,y}$ being the transverse component of the wind speed for measurement beam j, $v_{j,z}$ being the vertical component of the wind speed for measurement beam j, $a_j$, $b_j$, $c_j$ being constant measurement coefficients for measurement beam j. Measurements coefficients $a_j$, $b_j$, $c_j$ depend only on the beam angles of the LiDAR sensor and are not dependent on the measurement distances. The measurement coefficients $a_j$, $b_j$, $c_j$ can be data provided by the LiDAR sensor manufacturer.

2) Construction of a Wind Model

This step constructs a wind model, which accounts for the spatial coherence and the temporal coherence which define the wind speed and its components at any point in space according to various parameters, notably time and the position in space (therefore according to the coordinates of the point considered in the (x, y, z) system). In other words, a wind model meeting the spatial coherence constraints and the temporal coherence constraints is constructed. These spatial and temporal coherences allow the wind model to be representative of the wind and to provide precise determination of the wind speed.

According to one implementation of the invention, the wind model can determine the longitudinal and transverse components of the wind speed. Alternatively, the wind model can determine the three components of the wind speed.

According to one embodiment of the invention, the spatial coherence used in the wind model can depend on a transverse coherence, a longitudinal coherence and a vertical coherence. The representativity of the wind model is thus improved.

For this embodiment, the transverse coherence can be written by the equation: $v_{x,y1}=f_t(v_{x,y2},y1-y2)$, with x being the longitudinal component, $y_1$ being and $y_2$ being two transverse positions having the same longitudinal ($x_1=x_2=x$) and vertical ($z_1=z_2=z$) values, $v_{x,y1}$ being the longitudinal component of the wind speed at position $y_1$, $v_{x,y2}$ being the longitudinal component of the wind speed at position $y_2$, $f_t$ being a known predefined function. Thus, the longitudinal component of the wind speed at point $y_1$ depends on the longitudinal component of the wind speed at point $y_2$ and on the distance between points $y_1$ and $y_2$. According to an example embodiment, predefined function $f_t$ can be an exponential function.

For this embodiment, the vertical coherence can be written by the equation as:

$$v_{x,z1} = v_{x,z2}\left(\frac{z_1}{z_2}\right)^\alpha,$$

with x being the longitudinal component, $z_1$ and $z_2$ being vertical positions having the same longitudinal ($x_1=x_2=x$) and transverse ($y_1=y_2=y$) values, $v_{x,z1}$ being the longitudinal component of the wind speed at position $z_1$, $v_{x,z2}$ the longitudinal component of the wind speed at position $z_2$, $\alpha$ the coefficient of the power law. For this equation, the reference framework of the height z is defined with respect to the base of the wind turbine tower (and not at the LiDAR sensor). Thus, the longitudinal component of the wind speed at point $z_1$ depends on the longitudinal component of the wind speed at point $z_2$ and on the ratio between the heights of points $z_1$ and $z_2$. Coefficient α of the power law can be chosen to be constant, or it can be estimated using LiDAR sensor measurements, for example according to the method described in the patent applicationFR-19/06,569.

For this embodiment, the longitudinal coherence can be written by the equation: $v_{x,x1}(k)=f_l(v_{x,x2}(k), x_1-x_2$, with x being the longitudinal component, $x_1$ and $x_2$ being longitudinal positions having the same transverse ($y_1=y_2=y$) and vertical ($z_1=z_2=z$) values, $v_{x,x1}$ being the longitudinal component of the wind speed at position $x_1$, $v_{x,x2}$ being the longitudinal component of the wind speed at position $x_2$, $f_l$ being a known predefined function. Thus, the longitudinal component of the wind speed at point $x_1$ depends on the longitudinal component of the wind speed at point $x_2$ and on the distance between points $x_1$ and $x_2$. According to an example embodiment, predefined function $f_l$ can be an exponential function.

The temporal coherence is understood to be the variation with time of the wind speed components in a single position, that is for the same values x, y and z. In other words, the temporal coherence can be formulated as a relation between the wind speed components between two consecutive discrete time intervals, denoted by k and k−1.

According to an implementation of the invention, one known temporal coherence is obtained using the Kalmal spectrum that can be defined by:

$$S_t(f) = \sigma_t^2 \frac{4\frac{L_t}{U}}{\left(1+6f\frac{L_t}{U}\right)^{\frac{5}{3}}},$$

with f being the frequency in Hertz, t being the component of the wind speed (t can therefore correspond to x, y or z), $S_t$ being the Kaimal spectrum of component t of the wind speed, U being the average wind speed at the height of the wind turbine rotor, $L_t$ being the integral scale parameter of component t of the wind speed and of being the variance determined by the wind turbulence intensity. Indeed, the Kalmal spectrum allows determination of a discrete transfer function that can relate a wind value at time k to a wind value at time k−1.

For the embodiment where only the longitudinal and transverse components of the wind speed are determined, ω can be a vector of dimensions 2n, which first comprises the longitudinal components of the wind speed for the n points being considered, then the transverse components of the wind speed for the n points are considered. To illustrate this vector ω in a simple case, when a first point has longitudinal and transverse wind speed components $v_{x1}$, $v_{y1}$, and a second point has longitudinal and transverse wind speed components $v_{x2}$, $v_{y2}$, vector ω is written as:

ω=$(v_{x1}v_{x2}v_{y1}v_{y2})^T$

Using this notation and noting that the Kaimal spectrum is the Fourier transform of the autocorrelation function of the wind speed, the following equation can be written for the temporal coherence: ω(k)=$A_s$ω(k−1), with $A_s$ being a constant matrix which is the autocorrelation function of the wind speed obtained by a Kaimal spectrum. Matrix $A_s$ can be obtained from the Kaimal spectrum formula as defined above. Thus, this equation gives the connection between wind speed w at time k and wind speed ω at time k−1.

Alternatively, for the temporal coherence, the von Korman spectrum or any similar representation can be used.

3) Wind Measurement

In this step, the wind amplitude and direction are continuously measured in at least one measurement plane distant from the wind turbine, by the LiDAR sensor. This measurement corresponds to the signal received by the LiDAR sensor in response to the signal emitted by the LiDAR sensor. Indeed, by interferometry and Doppler effect, part of the laser signal emitted by the LiDAR sensor is reflected by the air molecules at the measurement point and also by the aerosols (suspended dust and microparticles).

According to an implementation of the invention, the measurement planes can be at a longitudinal distance (along axis x of FIG. 2) from the rotor plane preferably ranging between 50 and 400 m. It is thus possible to determine the evolution of the wind speed over a long distance upstream from the wind turbine, which also allows the accuracy of the average wind speed determination to be improved.

According to an embodiment of the invention, the wind speed measurement can be performed in several measurement planes (whose measurement distances are not imposed by the method according to the invention) to facilitate wind speed determination, which allows the user of the LiDAR sensor to freely parametrize the LiDAR sensor.

For the embodiment using a pulsed LiDAR, the measurements are obtained successively at the measurement points illustrated in FIG. 2, starting with beam b1, then beam b2, . . . and finally beam b4. An interesting characteristic of this system is that it allows measurement of the projection of the wind speed at several distances, simultaneously, for a given beam. It is thus possible to obtain, for example, 10 successive distances between 50 m and 400 m, at a sampling rate of the LiDAR sensor. At each sampling time, only the measurements of the selected current beam are refreshed.

4) Determination of the Wind Speed

This step determines the wind speed at various points of the space upstream from the wind turbine, by use of an adaptive Kalman filter using the wind model constructed in step 2, the LiDAR sensor measurement model constructed in step 1 and the measurements performed in step 3. The various wind speed determination points are predefined estimation points. Application of the Kalman filter allows obtaining a state observer. The adaptive Kalman filter enables adaptation of the noise covariance matrix according to the wind speed. Thus, the filter is efficient over a wide wind speed range. Moreover, the adaptive Kalman filter is robust wind speed variations.

It should be observed that a state observer or a state estimator is, in automation and systems theory, an extension of a model represented as a state representation. When the state of the system is not measurable, an observer allowing the state to be reconstructed from a model is constructed.

For an embodiment using the equations illustrated in step 2, the following state model can be written, with the equation of state: $v_x(k)=A_xv_x(k-1)+\eta(k)$ and the output equations:

$$\begin{cases} v_{x,y_1}(k) - f_t(v_{x,y_2}(k), y_1 - y_2) = \epsilon_t(x_1, x_2, y_1, y_2, z_1, z_2, k) \\ v_{x,z_1} - v_{x,z_2}\left(\frac{z_1}{z_2}\right)^\alpha = \epsilon_v(x_1, x_2, y_1, y_2, z_1, z_2, k) \\ v_{x,x_1}(k) - f_l(v_{x,x_2}(k), x_1 - x_2) = \epsilon_l(x_1, x_2, y_1, y_2, z_1, z_2, k) \\ m_{j,x}(k) = a_j v_{j,x}(k) + b_j v_{j,y}(k) + c_j v_{j,z}(k) + \epsilon_m(k) \end{cases}$$

with η being the noise of the equation of state, $\epsilon_t$ being the transverse noise, $\epsilon_v$ being the vertical noise, $\epsilon_l$ being the longitudinal noise and $\epsilon_m$ being the measurement noise.

Thus, the problem of estimating vector ω(k) becomes a state estimation problem, which does not require imposing the position of the measurement planes of the LiDAR sensor. One way of estimating the unknown state vector ω(k), which can take into account the information on noises η(k) and ε(k), applies the algorithm of the adaptive Kalman filter, with the following notation:

$$\varepsilon = \begin{pmatrix} \varepsilon_t \\ \varepsilon_v \\ \varepsilon_l \\ \varepsilon_m \end{pmatrix}.$$

Indeed, the adaptive Kalman filter provides the solution to the optimization problem:

$$\min_{w(k)} J_r(k)$$

with $$J_r(k) = \left\{ (\omega(0) - \bar{\omega}(0))^T P_0^{-1} (\omega(0) - \bar{\omega}(0)) + \sum_{j=1}^{k} \left( \eta(j-1)^T Q^{-1} \eta(j-1) + \epsilon(j)^T R^{-1} \epsilon(j) \right) \right\}$$

where $P_0$, Q and R are adjustment matrices of suitable dimensions, and $\bar{\omega}$ (0) is the average value of the initial state ω(0).

In order to solve this optimization problem by use of the adaptive Kalman filter, the following hypotheses can be made, notably for a mathematical interpretation of $P_0$, Q and R:
- ω(0) is a random vector uncorrelated with noises η(k) and ε(k)
- ω(0) has a known average $\bar{\omega}$ (0) with $P_0$ as the covariance matrix, that is:

$$P_0 = E[(\omega(0) - \bar{\omega}(0))^T]$$

- η(k) and ε(k) are zero-mean uncorrelated white noise processes with covariance matrices Q and R respectively, i.e.:

$$E[\eta(k)\eta(j)^T] = \begin{cases} Q & \text{if } k = j \\ 0 & \text{if } k \neq j \end{cases}$$

$$E[\epsilon(k)\epsilon(j)^T] = \begin{cases} R & \text{if } k = j \\ 0 & \text{if } k \neq j \end{cases}$$

$$E[\epsilon(k)\eta(j)^T] = 0 \text{ for all } k, j$$

This last hypothesis implies that Q and R are symmetric positive semidefinite matrices.

Furthermore, given that, in the state model, noises $\varepsilon_l$, $\varepsilon_v$, and $\varepsilon_t$ depend on measurement distances $x_1, x_2, y_1, y_2, z_1, z_2$, covariance matrix R is adapted according to the measurement distances. According to one embodiment, R can be a polynomial function of the measurement distances. Alternatively, R can be obtained from a map, a neural network, etc.

The following notations can be adopted:
- $\hat{w}(k|k-1)$ is the estimation of vector ω(k) given the measurements performed until time k−1;
- $\hat{w}(k|k)$ is the estimation of vector ω(k) given the measurements performed until time k;
- P(k|k−1) is the covariance matrix of vector ω(k) given the measurements performed until time k−1; and
- P(k|k) is the covariance matrix of vector ω(k) given the measurements performed until time k.

Then, the algorithm of the adaptive Kalman filter is used to determine the wind speed at various points, using the following equations:

On the one hand, a temporal update:

$$\begin{cases} \hat{\omega}(k|k-1) = A_s \hat{\omega}(k-1|k-1) \\ P(k|k-1) = A_s P(k-1|k-1) A_s^T + Q \end{cases}$$

On the other hand, a measurement update:

$$\begin{cases} K(k) = P(k|k-1) C_a^T (C_a P(k|k-1) C_a^T + R)^{-1} \\ \hat{\omega}(k|k) = \hat{\omega}(k|k-1) + K(k)(y(k) - C_a \hat{\omega}(k|k-1)) \\ P(k|k) = (I - K(k) C_a) P(k|k-1) \end{cases}$$

with $C_a$ obtained by linearizing the output equations of the state model around $\hat{w}(k|k-1)$, y(k) the measurements of the LiDAR sensor and I the identity matrix.

Thus, these steps allow determination of the vector ω, which comprises the components of the wind speed at several different points. In other words, these steps allow determination of the components of the wind speed at several different points.

5) Determination of the Average Wind Speed

This step determines the average wind speed in a vertical plane at a distance upstream from the wind turbine (the distance is defined by means of the longitudinal direction) by use of the wind speeds determined in step 4, in particular the wind speeds in the vertical plane are considered.

According to one embodiment, the average wind speed can be the average of the longitudinal components of the wind speed in the plane being considered.

According to a preferred embodiment of the invention, the average wind speed can be the average of the longitudinal components of the wind speed in the plane considered, which considers only the values of the wind speed in a surface corresponding to the surface swept by the rotor of the wind turbine. In other words, the surface swept by the rotor of the wind turbine (a circle of radius corresponding to the length of the wind turbine blades at nacelle height) is projected onto the vertical plane being considered, and the wind speeds are averaged for the points of the vertical plane belonging to this projection. This average speed is generally referred to as RAWS (Rotor Average Wind Speed) and commonly used for at least one of control, diagnosis, and monitoring of a wind turbine.

The present invention also relates to a method of controlling a wind turbine equipped with a LiDAR sensor. The following steps are carried out for this method:
- determining the average wind speed by use of the method of determining the average wind speed according to any one of the variants described above; and
- controlling the wind turbine according to the average wind speed that is determined.

Precise real-time determination of the average wind speed allows suitable wind turbine control in terms of minimization of the effects on the turbine structure and maximization of the recovered power. Indeed, through this control, the LiDAR sensor allows reduction of the loads on the structure, the blades and the tower representing 54% of the cost. Using a LiDAR sensor therefore allows optimizing the wind turbine structure and thus reducing the costs and maintenance.

The method can further comprise an intermediate step that determines the average wind speed in the rotor plane of the wind turbine from the average wind speed determined by the method. The wind movement time between the vertical plane and the rotor plane can therefore be taken into account (it can be calculated notably by considering Taylor's frozen turbulence hypothesis), it is also possible to account for the induction phenomenon between the vertical plane and the rotor plane (by use of an induction factor for example). The induction factor reflects the wind deceleration upstream from the wind turbine related to the presence of the wind turbine blades. The wind turbine is then controlled according to the average wind speed in the rotor plane.

According to an implementation of the invention, at least one of the inclination angle of the blades and the electrical recovery torque of the wind turbine generator can be controlled according to the wind speed. Other types of regulation devices can be used.

According to an embodiment of the invention, at least one of the inclination angle of the blades and electrical recovery torque can be determined by use of wind turbine maps according to the wind speed at the rotor. For example, the control method described in patent application FR-2,976,630 A1 which corresponds to US patent application 2012-0,321,463 can be applied.

Furthermore, the invention relates to a computer program product comprising code instructions designed to carry out the steps of one of the methods described above (method of determining the wind speed in the rotor plane, control method). The program can be executed on a processor of the LiDAR sensor or any similar processor linked to the LiDAR sensor or to the wind turbine.

According to an aspect, the present invention also relates to a LiDAR sensor for a wind turbine, comprising a processor configured to implement one of the methods described above (method of determining the average wind speed, control method).

According to an implementation of the invention, the LiDAR sensor can be a scanning LiDAR sensor, a continuous wave LiDAR sensor or a pulsed LiDAR sensor. The LiDAR sensor is preferably a pulsed LiDAR sensor.

The invention also relates to a wind turbine, notably an offshore (at sea) or an onshore (on land) wind turbine equipped with a LiDAR sensor as described above. According to an embodiment of the invention, the LiDAR sensor can be arranged on the nacelle of the wind turbine or in the hub of the turbine (at the end of the nacelle of the wind turbine). The LiDAR sensor is so oriented to measure the wind upstream from the turbine (i.e. before the wind turbine and along the longitudinal axis thereof, designated by axis x in FIG. 2). According to an embodiment, the wind turbine can be identical to the wind turbine illustrated in FIG. 2.

For the embodiment of the control method, the wind turbine can comprise a control, for example for control of the pitch angle of at least one blade of the wind turbine or of the electrical torque, for implementing the control method according to the invention.

It is clear that the invention is not limited to the embodiments of the methods described above by way of example and that it encompasses any variant embodiment.

EXAMPLE

The features and advantages of the method according to the invention will be clear from reading the example hereafter.

For this example, the wind is simulated by a simulator, as well as the LiDAR sensor measurements, and the average wind speed is determined by the method according to an embodiment of the invention. This embodiment of the invention uses the spatial and temporal coherence equations described, and it determines the average longitudinal component of the wind speed in a vertical plane.

According to a first configuration, the measurement plane distances are: [50, 70, 90, 100, 120, 140, 160, 180, 190, 200] meters.

FIG. 3 illustrates a comparison of the average wind speed RAWS in m/s as a function of time T for a 100 m distance between the rotor plane and the vertical plane. In this figure, the curve in dotted line represents reference curve REF and the curve in solid line represents the average wind speed curve EST obtained by the method according to the invention. It is noted that the two curves are nearly superposed. Therefore, the method according to the invention enables precise determination of the average wind speed.

According to a second configuration, the measurement plane distances are: [50, 80, 90, 110, 130, 150, 170, 180, 190, 200] meters.

FIG. 4 illustrates a comparison of the average wind speed RAWS in m/s as a function of time T for a 110 m distance between the rotor plane and the vertical plane. In this figure, the curve in dotted line represents reference curve REF and the curve in solid line represents the average wind speed curve EST obtained by the method according to the invention. It is noted that the two curves are nearly superposed. Therefore, the method according to the invention enables precise determination of the average wind speed.

These two curves also allow showing that the method is accurate whatever the distance considered, without imposing any measurement plane distance.

The invention claimed is:

1. A method of determining average wind speed in at least one vertical measurement plane with a LiDAR sensor positioned on a wind turbine including blades and a generator, comprising steps of:
   a) constructing a model of measurements of the LiDAR sensor;
   b) constructing a wind model accounting for spatial coherence and temporal coherence of wind speed;
   c) performing LiDAR measurements with the LiDAR sensor used to determine wind amplitude and wind direction in at least one of the vertical wind measurement planes spaced a distance from the wind turbine and the at least one vertical wind measurement plane being parallel and spaced at a distance from a rotor plane of the wind turbine;
   d) determining wind speed at predefined estimation points in space upstream from the wind turbine by using an adaptive Kalman filter using the model of the LiDAR measurements, the wind model, and the LiDAR measurements;
   e) determining the average wind speed in the at least one vertical plane spaced at the distance from the wind turbine by using the wind speeds determined for the predefined estimation points within the at least one vertical plane being considered; and
   f) controlling the wind turbine according to the determined average wind speed, by controlling at least one of an inclination angle of the blades of the wind turbine and the electrical recovery torque of the generator of the wind turbine.

2. The method as claimed in claim 1, wherein the model of the LiDAR measurements is written as: $m_{j,x}(k)=a_j v_{j,x}(k)+$ $b_j v_{j,y}(k) + c_j v_{j,z}(k)$, with m being the measurements, x being the longitudinal direction, j being a measurement beam of the LiDAR sensor, $m_{j,x}$ being the measurement on measurement beam j at distance x, k being discrete time, v being the wind speed, $v_{j,x}$ being the longitudinal component of the wind speed for measurement beam j, $v_{j,y}$ being the transverse component of the wind speed for measurement beam j, $v_{j,z}$ being the vertical component of the wind speed for measurement beam j, and $a_j$, $b_j$, $c_j$ being constant measurement coefficients for measurement beam j.

3. The method as claimed in claim 1, wherein the spatial coherence of the wind model is a function of a transverse coherence, a vertical coherence and a longitudinal coherence.

4. The method as claimed in claim 2, wherein the spatial coherence of the wind model is a function of a transverse coherence, a vertical coherence and a longitudinal coherence.

5. The method as claimed in claim 3, wherein the transverse coherence is written as: $v_{x,y1} = f_t(v_{x,y2}, y_1 - y_2)$, with x being the longitudinal component, $y_1$ and $y_2$ being two transverse positions having the same longitudinal and vertical values, $v_x$ and $y_1$ being the longitudinal component of the wind speed at position $y_1$, $v_x$ and $y_2$ being the longitudinal component of the wind speed at position $y_2$, and $f_t$ being a predefined function.

6. The method as claimed in claim 4, wherein the transverse coherence is expressed as: $v_{x,y1} = f_t(v_{x,y2}), y_1 - y_2)$, with x being longitudinal component, $y_1$ and $y_2$ being two transverse positions having the same longitudinal and vertical values, $v_x$ and $y_1$ being the longitudinal component of the wind speed at position $y_1$, $v_x$ and $y_2$ being the longitudinal component of the wind speed at position $y_2$, and $f_t$ being a predefined function.

7. The method as claimed in claim 3, wherein the vertical coherence is written as:

$$v_{x,z1} = v_{x,z2} \left(\frac{z_1}{z_2}\right)^\alpha$$

with x being a longitudinal component, $z_1$ and $z_2$ being vertical positions having identical longitudinal and transverse values, $v_x$ and $z_1$ being the longitudinal component of the wind speed at position $z_1$, $v_x$ and $z_2$ being a longitudinal component of wind speed at position $z_2$, and $\alpha$ being the coefficient of the power law.

8. The method as claimed in claim 3, wherein the longitudinal coherence is written expressed as: $v_{x,x1}(k) = f_t(v_{x,y2}(k), x_1 - x_2)$, with x being a longitudinal component, k being discrete time, $x_1$ and $x_2$ being longitudinal positions having identical transverse and vertical values, $v_x$ and $x_1$ being a longitudinal component of the wind speed at position $x_1$, $v_x$ and $x_2$ being the longitudinal component of the wind speed at position $x_2$, and $f_l$ being a predefined function.

9. The method as claimed in claim 1, wherein the temporal coherence of wind model is expressed as: $\omega(k) = A_s \omega(k-1)$, with k being discrete time, $\omega$ being a vector comprising first longitudinal components of wind speed at n predefined estimation points, then transverse components of the wind speed for the n predefined estimation points, $A_s$ being a constant matrix which is the autocorrelation function of the wind speed obtained by a Kaimal spectrum.

10. The method as claimed in claim 1, wherein the adaptive Kalman filter is applied to equations as follows:

$$v_x(k) = A_s v_x(k-1) + \eta(k) \text{ and}$$

$$\begin{cases} v_{x,y_1}(k) - f_t(v_{x,y_2}(k), y_1 - y_2) = \epsilon_t(x_1, x_2, y_1, y_2, z_1, z_2, k) \\ v_{x,z_1} - v_{x,z_2}\left(\frac{z_1}{z_2}\right)^\alpha = \epsilon_v(x_1, x_2, y_1, y_2, z_1, z_2, k) \\ v_{x,x_1}(k) - f_l(v_{x,x_2}(k), x_1 - x_2) = \epsilon_l(x_1, x_2, y_1, y_2, z_1, z_2, k) \\ m_{j,x}(k) = a_j v_{j,x}(k) + b_j v_{j,y}(k) + c_j v_{j,z}(k) + \epsilon_m(k) \end{cases}$$

with k being discrete time, v being wind speed, x being a longitudinal component, $y_1$ and $y_2$ being transverse positions having identical longitudinal and vertical values, $x_1$ and $x_2$ being longitudinal positions having identical transverse and vertical values, $z_1$ and $z_2$ being vertical positions having identical longitudinal and transverse values, $v_x$ and $y_1$ being a longitudinal component of the wind speed at position $y_1$, $v_x$ and $y_2$ being a longitudinal component of the wind speed at position $y_2$, $f_t$ being a predefined function, $v_x$ and $x_1$ being a longitudinal component of the wind speed at position $x_1$, $v_x$ and $x_2$ being a longitudinal component of the wind speed at position $x_2$, $f_l$ being a predefined function, $v_x$ and $z_1$ being the longitudinal component of the wind speed at position $z_1$, $v_x$ and $z_2$ being a longitudinal component of the wind speed at position $z_2$, $\alpha$ being a coefficient of a power law, j being a measurement beam of the LiDAR sensor, $m_{j,x}$ being a measurement on measurement beam j at distance x, $v_j$ and x being a longitudinal component of wind speed for measurement beam j, $v_j$ and y being a transverse component of wind speed for measurement beam j, $v_j$ and z being a vertical component of wind speed for measurement beam j, $a_j$, $b_j$, $c_j$ being constant measurement coefficients for measurement beam j, $\eta$ being noise of equation of state, $\varepsilon_t$ being transverse noise, $\varepsilon_v$ being vertical noise, a being longitudinal noise, $\varepsilon_m$ being measurement noise, $A_s$ being a constant matrix which is an autocorrelation function of wind speed obtained by a Kaimal spectrum.

11. The method as claimed in claim 1, wherein the wind speed is determined at different points using equations:

$$\begin{cases} \hat{\omega}(k|k-1) = A_s \hat{\omega}(k-1|k-1) \\ P(k|k-1) = A_s P(k-1|k-1) A_s^T + Q \end{cases}$$

$$\begin{cases} K(k) = P(k|k-1) C_a^T (C_a P(k|k-1) C_a^T + R)^{-1} \\ \hat{\omega}(k|k) = \hat{\omega}(k|k-1) + K(k)(y(k) - C_a \hat{\omega}(k|k-1)) \\ P(k|k) = (I - K(k) C_a) P(k|k-1) \end{cases}$$

with k being discrete time, $\omega$ being a vector comprising first longitudinal components of wind speed at n predefined estimation points, $\hat{w}(k|k-1)$ being an estimation of vector $\omega(k)$ given the measurements performed until time k-1, $\hat{w}(k|k)$ being an estimation of vector $\omega(k)$ given measurements performed until time k, $P(k|k-1)$ being a covariance matrix of vector $\omega(k)$ given the measurements performed until time k-1, $P(k|k)$ being a covariance matrix of vector $\omega(k)$ given the measurements performed until time k, $A_s$ is a constant matrix which is the autocorrelation function of wind speed obtained by the Kaimal spectrum, Q and R being covariance matrices of noises $\varepsilon(k)$ and $\eta(k)$, and $C_a$ is obtained by linearizing output equations around $\hat{w}(k|k-1)$, y(k) being the measurements of the LiDAR sensor and I being an identity matrix.

12. A method as claimed in claim 1, wherein the wind speed is determined in the at least one vertical plane spaced the distance from the wind turbine by using the average longitudinal components of the wind speed at points within the respective vertical plane, for wind speeds considered included in a projection of a surface swept by a rotor of the wind turbine in the vertical plane being considered.

13. A LiDAR sensor, comprising a processor which performs steps a)-e) of the method as claimed in claim 1.

14. A wind turbine comprising a LiDAR sensor as claimed in claim 13, with the LiDAR sensor being positioned on a nacelle of the wind turbine or in a hub of the wind turbine.

* * * * *